(12) United States Patent
Ishikawa

(10) Patent No.: US 11,536,347 B2
(45) Date of Patent: Dec. 27, 2022

(54) FLUID-FILLED VIBRATION DAMPING DEVICE

(71) Applicant: SUMITOMO RIKO COMPANY LIMITED, Komaki (JP)

(72) Inventor: Ryota Ishikawa, Komaki (JP)

(73) Assignee: SUMITOMO RIKO COMPANY LIMITED, Komaki (JP)

( * ) Notice: Subject to any disclaimer, the term of this patent is extended or adjusted under 35 U.S.C. 154(b) by 124 days.

(21) Appl. No.: 17/074,003

(22) Filed: Oct. 19, 2020

(65) Prior Publication Data

US 2021/0033167 A1     Feb. 4, 2021

Related U.S. Application Data

(63) Continuation of application No. PCT/JP2019/016521, filed on Apr. 17, 2019.

(30) Foreign Application Priority Data

Aug. 24, 2018    (JP) .............................. JP2018-157599

(51) Int. Cl.
     *F16F 13/10*        (2006.01)
     *B60K 5/12*         (2006.01)

(52) U.S. Cl.
     CPC .......... *F16F 13/107* (2013.01); *F16F 13/106* (2013.01); *B60K 5/1208* (2013.01)

(58) Field of Classification Search
     CPC ........ F16F 13/10; F16F 13/105; F16F 13/106; F16F 13/107; F16F 13/26; F16F 1/54;
(Continued)

(56) References Cited

U.S. PATENT DOCUMENTS 4,641,817 A  *   2/1987   Clark ..................... F16F 13/08
                                                                  267/140.13
4,781,362 A     11/1988   Reuter et al.
(Continued)

FOREIGN PATENT DOCUMENTS

CN           102265059 A  *   11/2011          F16F 13/105
DE      112012000231 T5  *   8/2013          F16F 13/08
(Continued)

OTHER PUBLICATIONS

English translation of JP2002070929A (Year: 2000).*
(Continued)

*Primary Examiner* — Robert A. Siconolfi
*Assistant Examiner* — Mahbubur Rashid
(74) *Attorney, Agent, or Firm* — Oliff PLC

(57) ABSTRACT

A fluid-filled vibration damping device including: primary and auxiliary liquid chambers; a partition provided between the two chambers; and a movable plate supported movably in a plate thickness direction thereof by the partition. The movable plate receives liquid pressure of the two chambers on its opposite faces so as to constitute a liquid pressure absorber. The partition includes at least one communication hole opening onto its surface facing the movable plate. The movable plate includes at least one elastic protrusion projecting toward the communication hole. The elastic protrusion includes a peripheral wall to be pressed in compression and shear directions and be elastically deformed to a radially inner side of the communication hole as well by coming into contact with a wall portion of the communication hole due to movement of the movable plate in the plate thickness direction.

10 Claims, 11 Drawing Sheets

(58) Field of Classification Search
CPC ...... F16F 2228/066; F16F 9/348; F16F 1/376; F16F 13/266; B60K 5/1208; B60G 2204/128; B60G 2204/18
See application file for complete search history.

(56) References Cited

U.S. PATENT DOCUMENTS

| | | | | |
|---|---|---|---|---|
| 4,813,513 | A * | 3/1989 | Le Salver | B60K 5/1283 |
| | | | | 180/902 |
| 7,328,888 | B2 * | 2/2008 | Sakata | F16F 13/106 |
| | | | | 267/140.13 |
| 2005/0200060 | A1 * | 9/2005 | Hiraoka | F16F 13/106 |
| | | | | 267/140.13 |
| 2006/0066016 | A1 * | 3/2006 | Hasegawa | F16F 13/106 |
| | | | | 267/140.13 |
| 2009/0140476 | A1 | 6/2009 | Michiyama et al. | |
| 2013/0154171 | A1 * | 6/2013 | Nishi | F16F 13/106 |
| | | | | 267/140.13 |
| 2015/0123326 | A1 * | 5/2015 | Kadowaki | F16F 13/106 |
| | | | | 267/140.13 |
| 2019/0154105 | A1 | 5/2019 | Ishikawa et al. | |

FOREIGN PATENT DOCUMENTS

| | | | | |
|---|---|---|---|---|
| EP | 1111267 | A1 | | 6/2001 |
| JP | S62-053735 | B2 | | 11/1987 |
| JP | H06307489 | A | * | 4/1993 |
| JP | 2002-70929 | A | | 3/2002 |
| JP | 2002295571 | A | * | 10/2002 |
| JP | 2008232233 | A | * | 10/2008 |
| JP | 2009150451 | A | * | 7/2009 |
| JP | 5543031 | B2 | * | 7/2014 ............ F16F 13/106 |

OTHER PUBLICATIONS

JP 5543031 B2 (Year: 2014).*
JP 5801134 B2 (Year: 2015).*
Mar. 2, 2021 International Preliminary Report on Patentability issued in International Patent Application No. PCT/JP2019/016521.
Jul. 16, 2019 International Search Report issued in International Patent Application No. PCT/JP2019/016521.
Aug. 31, 2021 Office Action issued in Chinese Patent Application No. 201980031103.5.

* cited by examiner

FLUID-FILLED VIBRATION DAMPING DEVICE

INCORPORATED BY REFERENCE

This application is a Continuation of International Application No. PCT/JP2019/016521 filed Apr. 17, 2019, which claims priority under 35 U.S.C. §§ 119(a) and 365 of Japanese Patent Application No. 2018-157599 filed on Aug. 24, 2018, the disclosures of which are expressly incorporated herein by reference in their entireties.

BACKGROUND OF THE INVENTION

1. Field of the Invention

The present invention relates to a fluid-filled vibration damping device used for, for example, an engine mount, a body mount, a member mount of an automobile, or the like.

2. Description of the Related Art

Conventionally, there is known a fluid-filled vibration damping device incorporating a liquid pressure absorber using a movable plate as one type of vibration damping supports or vibration damping connectors interposed between components that make up a vibration transmission system in order to provide vibration damping linkage between the components. For example, as shown in Japanese Examined Patent Publication No. JP-B-S62-53735, a movable plate is supported by a partition provided between a primary liquid chamber and an auxiliary liquid chamber so as to be movable in the plate thickness direction, and the movable plate is configured to absorb and reduce relative pressure fluctuations in the primary liquid chamber and the auxiliary liquid chamber.

However, in such a fluid-filled vibration damping device, noise and vibration may occur due to the movable plate striking against the partition during movement. Although it has been proposed to provide a solid elastic protrusion on the surface of the movable plate to moderate the impact upon striking against the partition, it is difficult to obtain a sufficient effect of moderating the impact.

SUMMARY OF THE INVENTION

It is therefore one object of this invention to provide a fluid-filled vibration damping device of novel structure which is able to reduce or prevent problems such as noise and vibration due to a movable plate striking against a partition in a liquid pressure absorber.

The above and/or optional objects of this invention may be attained according to at least one of the following preferred embodiments of the invention. The following preferred embodiments and/or elements employed in each preferred embodiment of the invention may be adopted at any possible optional combinations.

A first preferred embodiment of the present invention provides a fluid-filled vibration damping device comprising: a primary liquid chamber; an auxiliary liquid chamber; a partition provided between the primary liquid chamber and the auxiliary liquid chamber; and a movable plate supported movably in a plate thickness direction thereof by the partition, the movable plate receiving on one face thereof liquid pressure of the primary liquid chamber and on another face thereof liquid pressure of the auxiliary liquid chamber so as to constitute a liquid pressure absorber, wherein at least one communication hole opens onto a surface of the partition, the surface facing the movable plate, at least one elastic protrusion projects from the movable plate toward the communication hole, and the elastic protrusion includes a peripheral wall, the peripheral wall being configured to be pressed in a compression direction as well as in a shear direction and be elastically deformed to a radially inner side of the communication hole as well by means of the peripheral wall coming into contact with a wall portion of the communication hole due to movement of the movable plate in the plate thickness direction.

According to the fluid-filled vibration damping device structured following the present preferred embodiment, when the peripheral wall of the elastic protrusion come into contact with the partition, the peripheral wall is pressed in the shear direction as well and is elastically deformed to the radially inner side as well. This makes a degree of freedom in tuning the cushioning action greater than that of a conventional elastic protrusion that undergoes simple compressive deformation. As a result, for example, it is possible to improve the cushioning performance owing to the low spring characteristics at the initial stage of contact or the like, thereby reducing noise and vibration due to striking of the movable plate against the partition.

A second preferred embodiment of the present invention provides the fluid-filled vibration damping device according to the first preferred embodiment, wherein the elastic protrusion of the movable plate includes a hollow annular peripheral wall serving as the peripheral wall.

According to the fluid-filled vibration damping device structured following the present preferred embodiment, by employing the hollow annular peripheral wall, it is possible to improve the overall durability of the peripheral wall or the like. Note that the entire peripheral wall in the height direction need not be annular. For example, it would also be acceptable that the proximal end portion in the direction of protrusion of the peripheral wall has an annular shape that continues around the entire circumference in the circumferential direction, while the distal end portion may be divided into a plurality of segments in the circumferential direction by slits extending in the height direction or the like.

A third preferred embodiment of the present invention provides the fluid-filled vibration damping device according to the first or second preferred embodiment, wherein the movable plate includes a cushion projection projecting toward the partition, and an amount of movement of the movable plate in the plate thickness direction until the cushion projection comes into contact with the partition is greater than an amount of movement of the movable plate in the plate thickness direction until the elastic protrusion comes into contact with the communication hole and is elastically deformed.

According to the fluid-filled vibration damping device structured following the present preferred embodiment, for example, at the time of input of a large amplitude, the cushion projection comes into contact with the partition after the elastic protrusion comes into contact with the partition. This makes it possible to exhibit a limiting action of an amount of the movement of the movable plate due to a stepwise cushioning action or nonlinear elasticity with respect to the contact of the movable plate with the partition.

A fourth preferred embodiment of the present invention provides the fluid-filled vibration damping device according to any one of the first through third preferred embodiments, wherein the at least one communication hole of the partition comprises a plurality of communication holes while the at least one elastic protrusion of the movable plate comprises a plurality of elastic protrusions, and the communication holes and the elastic protrusions are provided at corresponding positions.

According to the fluid-filled vibration damping device structured following the present preferred embodiment, at a plurality of positions in the movable plate, there are provided elastic protrusions including the peripheral wall configured to be pressed in the compression direction and in the shear direction due to contact with the partition and be elastically deformed to the radially inner side of the communication hole. This makes it possible to obtain a good cushioning action at the time of contact with the partition over a wide range of the movable plate, for example.

A fifth preferred embodiment of the present invention provides the fluid-filled vibration damping device according to any one of the first through fourth preferred embodiments, wherein the communication hole of the partition includes a radially inner surface with which the peripheral wall of the elastic protrusion is configured to come into contact, the peripheral wall of the elastic protrusion includes a radially outer surface configured to come into contact with the communication hole, and at least one of the radially inner surface of the communication hole and the radially outer surface of the peripheral wall of the elastic protrusion comprises a tapered sloping surface.

According to the fluid-filled vibration damping device structured following the present preferred embodiment, by adopting the tapered sloping surface at the contact section between the peripheral wall of the elastic protrusion and the wall portion of the communication hole, the guiding action of elastically deforming the peripheral wall toward the radially inner side of the communication hole at the time of contact is more effectively exhibited.

A sixth preferred embodiment of the present invention provides the fluid-filled vibration damping device according to any one of the first through fifth preferred embodiments, wherein the peripheral wall has a shape in which a thickness dimension is smaller in a distal end portion thereof than in a proximal end portion thereof.

According to the fluid-filled vibration damping device structured following the present preferred embodiment, for example, nonlinear load-deflection characteristics can be realized in the peripheral wall during contact with the wall portion of the communication hole. Besides, the thickness dimension and the rubber volume of the proximal end portion of the peripheral wall can also be sufficiently obtained, thereby improving the durability.

A seventh preferred embodiment of the present invention provides the fluid-filled vibration damping device according to any one of the first through sixth preferred embodiments, wherein the movable plate is elastically deformable by being formed of an elastic material, and deformation rigidity of the movable plate is varied in a plate surface direction.

According to the fluid-filled vibration damping device structured following the present preferred embodiment, the movable plate is provided with a portion that is relatively easy to deform and a portion that is relatively difficult to deform. Thus, the elastic protrusions formed in these portions are prevented from coming into contact with the wall portions of the communication holes at the same time. Therefore, the timings when the elastic protrusions strike the partition are dispersed, thereby further reducing the striking noise and the like.

The deformation rigidity of the movable plate in the plate surface direction can be varied by employing, for example, the following eighth or ninth preferred embodiment.

An eighth preferred embodiment of the present invention provides the fluid-filled vibration damping device according to the seventh preferred embodiment, wherein the deformation rigidity of the movable plate is varied in the plate surface direction by a planar shape of the movable plate being non-circular.

A ninth preferred embodiment of the present invention provides the fluid-filled vibration damping device according to the seventh or eighth preferred embodiment, wherein the deformation rigidity of the movable plate is varied in the plate surface direction by a thickness dimension of the movable plate being varied in the plate surface direction.

A tenth preferred embodiment of the present invention provides the fluid-filled vibration damping device according to any one of the first through ninth preferred embodiments, wherein in the partition, the communication hole is located unevenly in a plate surface direction of the movable plate.

According to the fluid-filled vibration damping device structured following the present preferred embodiment, fluid pressure can be exerted on the movable plate through the communication hole unevenly in the plate surface direction of the movable plate. As a result, by displacing a part of the movable plate earlier or the like, it is also possible to disperse the timings of contact of the elastic protrusions with the partition.

According to the fluid-filled vibration damping device structured following the present invention, by adopting the elastic protrusion of the novel structure in the contact section of the movable plate with the partition, it is possible to effectively reduce noise and vibration due to striking of the movable plate against the partition.

BRIEF DESCRIPTION OF THE DRAWINGS

The foregoing and/or other objects, features and advantages of the invention will become more apparent from the following description of practical embodiments with reference to the accompanying drawings in which like reference numerals designate like elements and wherein:

FIG. 20A shows a state before the movable plate is mounted onto the partition, and FIG. 20B shows a state where the movable plate is mounted onto the partition.

DETAILED DESCRIPTION OF EMBODIMENTS

Hereinafter, in order to more specifically clarify the present invention, practical embodiments of the present invention will be described in detail with reference to the drawings.

Figure 1:
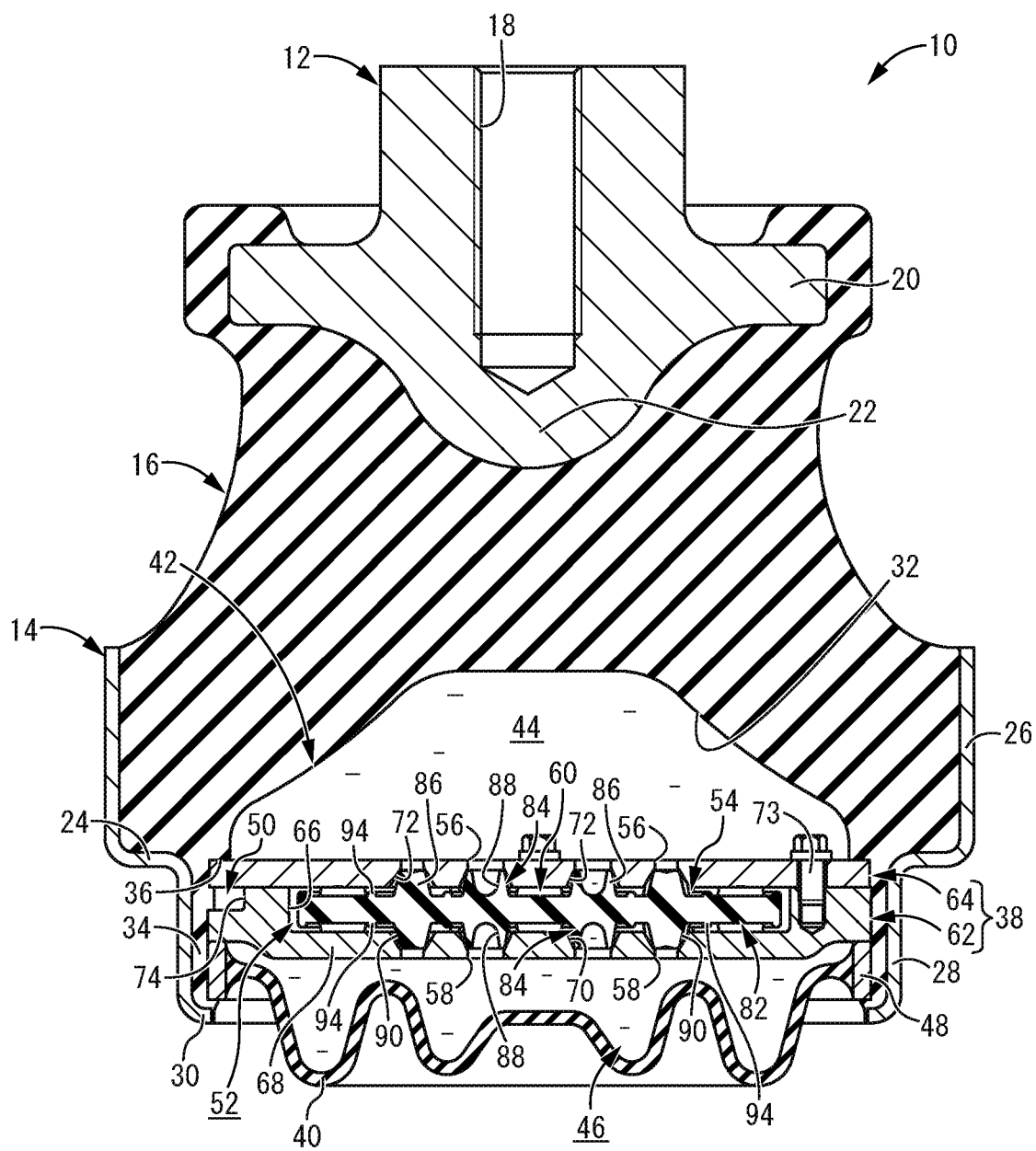
FIG. 1 is a vertical cross-sectional view showing a fluid-filled vibration damping device according to a first practical embodiment of the present invention.

First, FIG. 1 shows an automotive engine mount 10 according to a first practical embodiment of a fluid-filled vibration damping device in accordance with the present invention. The engine mount 10 has a structure in which a first mounting member 12 and a second mounting member 14 are elastically connected by a main rubber elastic body 16. The first mounting member 12 is mounted onto a power unit side, while the second mounting member 14 is mounted onto a vehicle body side, so that the engine mount 10 is interposed between the power unit and the vehicle body, thereby supporting the power unit with respect to the vehicle body in a vibration damping manner. In the following description, the vertical direction and the axial direction refer to the vertical direction in FIG. 1, which coincides with the mount axial direction.

Described more specifically, the first mounting member 12 has a block shape extending in the vertical direction with a roughly circular cross section overall, and is a rigid member made of metal or rigid synthetic resin. The first mounting member 12 includes a screw hole 18 bored on the center axis from the upper end surface. Further, the first mounting member 12 integrally includes a roughly annular flanged protrusion 20 projecting on its outer peripheral surface, and the lower side of the flanged protrusion 20 is a lower protrusion 22 that has a tapered outer peripheral surface gradually decreasing in diameter downward.

The second mounting member 14 has a large-diameter, generally round tubular shape overall, and is a rigid member made of metal or rigid synthetic resin. An annular stepped part 24 that spreads in the axis-perpendicular direction is provided in the vertically middle portion of the second mounting member 14, and the upper portion of the stepped part 24 comprises a large-diameter tube part 26, while the lower portion of the stepped part 24 comprises a small-diameter tube part 28. Moreover, the lower opening edge portion of the second mounting member 14 is provided with a caulking part 30 formed by being bent to the radially inner side.

Then, the first mounting member 12 is disposed roughly coaxially with the second mounting member 14 so as to be remote above the second mounting member 14 in the axial direction. Besides, the first mounting member 12 and the second mounting member 14 are connected by the main rubber elastic body 16.

The main rubber elastic body 16 has a roughly truncated circular cone shape, and includes a tapered outer peripheral surface whose diameter is gradually reduced upward in the axial direction. The small-diameter side end of the main rubber elastic body 16 is fixed to the first mounting member 12. That is, with the flanged protrusion 20 overlapped on the small-diameter end face of the main rubber elastic body 16 while the lower protrusion 22 inserted axially downward from the center of the small-diameter end face of the main rubber elastic body 16, the small-diameter side end of the main rubber elastic body 16 is bonded by vulcanization to the first mounting member 12. In the present practical embodiment, the main rubber elastic body 16 wraps upward around the flanged protrusion 20 from the outer peripheral surface thereof, so as to provide a cushion rubber on the outer peripheral surface and the upper surface of the flanged protrusion 20.

Furthermore, the large-diameter side end of the main rubber elastic body 16 is fixed to the second mounting member 14. That is, the large-diameter side end of the main rubber elastic body 16 is overlapped and bonded by vulcanization over roughly the entire inside surface of the large-diameter tube part 26 of the second mounting member 14.

In the present practical embodiment, the main rubber elastic body 16 is constituted as an integrally vulcanization molded component incorporating the first mounting member 12 and the second mounting member 14. The upper opening of the second mounting member 14 is fluid-tightly covered by the main rubber elastic body 16.

Moreover, a large-diameter recess 32 having an inverted, roughly bowl shape is formed on the large-diameter side end of the main rubber elastic body 16. The radially inner surface of the small-diameter tube part 28 of the second mounting member 14 is covered with a seal rubber layer 34. At the boundary part between the lower end of the main rubber elastic body 16 and the upper end of the seal rubber layer 34, there is formed an annular contacting stepped face 36.

Besides, a partition 38 and a flexible film 40 are inserted and attached to the second mounting member 14 from its lower opening. Then, by covering the lower opening of the second mounting member 14 with the flexible film 40, a fluid chamber 42 is defined between axially opposed faces of the main rubber elastic body 16 and the flexible film 40. Furthermore, the fluid chamber 42 is filled with a non-compressible fluid such as water, an alkylene glycol, a polyalkylene glycol, and silicone oil. In the present practical embodiment, a low-viscosity fluid having viscosity of 0.1 Pa·s or lower is preferably adopted as the sealed fluid.

Additionally, the fluid chamber 42 is partitioned by the partition 38 having a generally circular disk shape. Accordingly, above the partition 38, which extends in the axis-perpendicular direction, there is formed a primary liquid chamber 44 whose wall portion is partially defined by the main rubber elastic body 16. Meanwhile, below the partition 38, there is formed an auxiliary liquid chamber 46 whose wall portion is partially defined by the flexible film 40.

The flexible film 40 is constituted by a rubber film of thin, circular disk shape having a slack so as to be easily deformed. Besides, a ring fitting 48 having a roughly annular shape is bonded by vulcanization to the outer peripheral edge of the flexible film 40. The ring fitting 48 incorporating the flexible film 40 is inserted into the lower end opening of the second mounting member 14 and is fastened by caulking with the caulking part 30, so that the flexible film 40 is attached to the second mounting member 14.

In addition, the primary liquid chamber 44 and the auxiliary liquid chamber 46 are connected to each other by an orifice passage 50 extending in the circumferential direction on the outer peripheral portion of the partition 38. When vibration is input with the engine mount 10 mounted onto the vehicle, fluid flow through the orifice passage 50 is configured to be produced based on the relative pressure fluctuations induced between the primary liquid chamber 44 and the auxiliary liquid chamber 46. The length, cross-sectional area and the like of the orifice passage 50 are tuned so as to improve the vibration damping performance against low-frequency, large-amplitude vibration such as engine shake, based on the flow action of the fluid through the orifice passage 50.

Furthermore, a housing area 52 is provided inside the partition 38, and a movable plate 54 is housed within the housing area 52. The movable plate 54 is movable in the plate thickness direction with a moving stroke regulated by the upper and lower wall portions of the housing area 52. Besides, the movable plate 54 receives pressure of the primary liquid chamber 44 on its upper face through an upper communication hole 56 provided in the upper wall portion of the housing area 52, while receiving pressure of the auxiliary liquid chamber 46 on its lower face through a lower communication hole 58 provided in the lower wall portion of the housing area 52. When vibration is exerted with the engine mount 10 mounted onto the vehicle, the movable plate 54 is configured to displace within the housing area 52 based on the relative pressure fluctuations exerted on the upper and lower faces thereof from the primary liquid chamber 44 and the auxiliary liquid chamber 46, thereby constituting a liquid pressure absorber 60. By so doing, the small-amplitude pressure fluctuations in the primary liquid chamber 44 are absorbed and reduced, and the high dynamic spring behavior due to the antiresonance action of the orifice passage 50 or the like is suppressed during input of high-frequency vibration such as driving rumble, thereby improving vibration damping performance.

Figure 2:
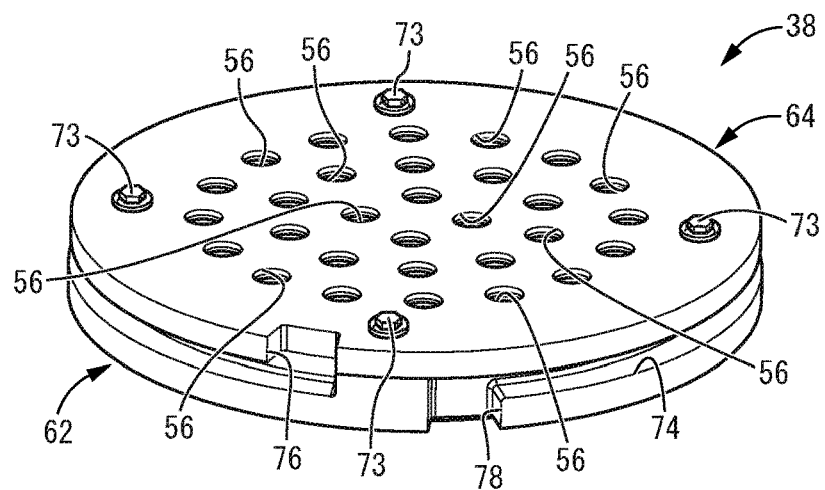
FIG. 2 is a perspective view showing a partition that constitutes the fluid-filled vibration damping device shown in FIG. 1 in a state where a movable plate is supported.
Figure 3:
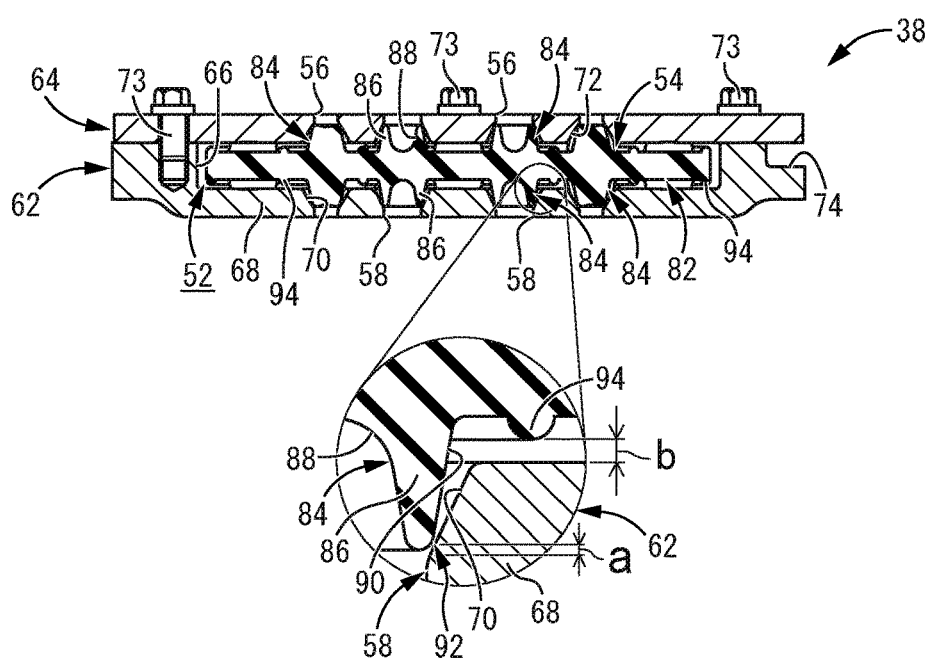
FIG. 3 is a vertical cross-sectional view of the partition shown in FIG. 2.

Meanwhile, as FIGS. 2 and 3 depict the partition 38 of the present practical embodiment in isolation, the partition 38 has a structure in which a lid member 64 is overlapped on the partition main body 62 and they are fixed to each other. The partition main body 62 and the lid member 64 can be preferably formed of metal or rigid synthetic resin.

Figure 4:
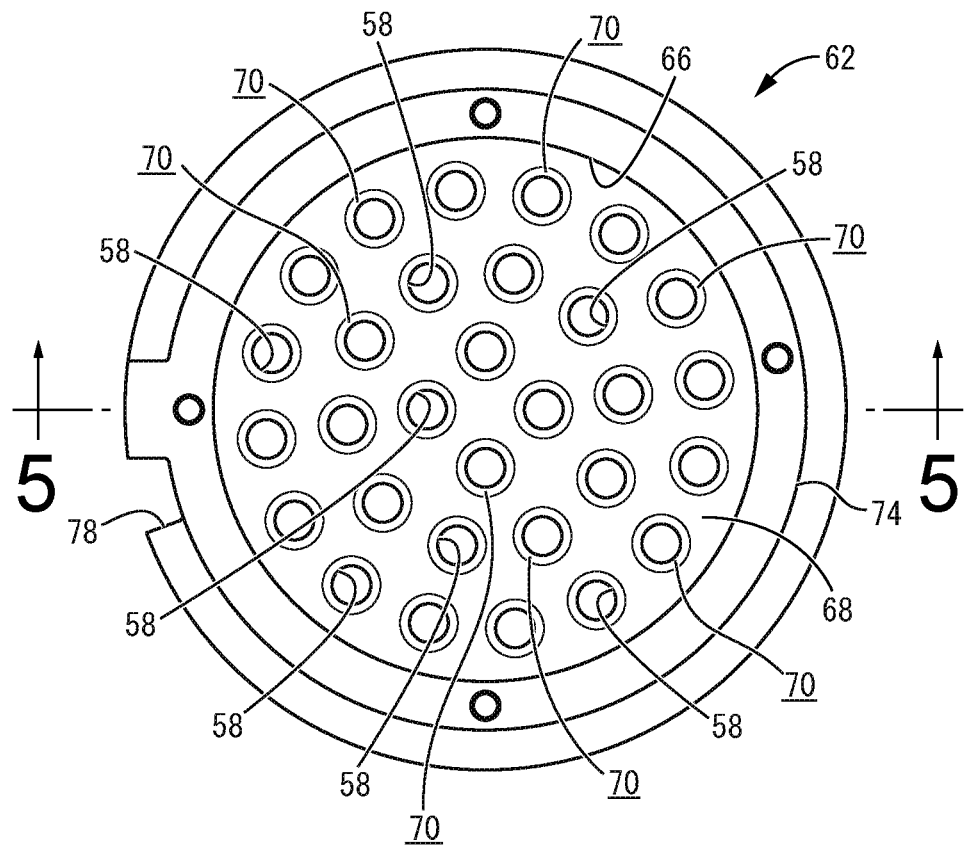
FIG. 4 is a top plan view showing a partition main body that constitutes the partition shown in FIG. 2.
Figure 5:
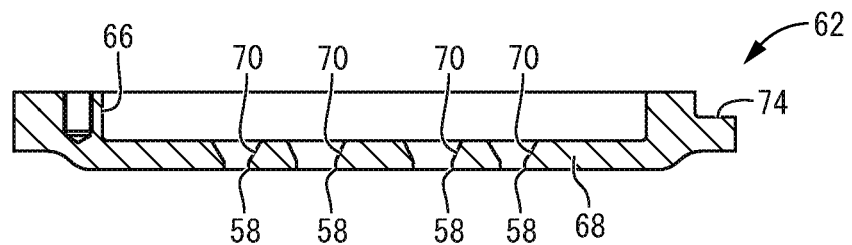
FIG. 5 is a cross-sectional view taken along line 5-5 of FIG. 4.

As shown in FIGS. 4 and 5, the partition main body 62 has a generally circular disk shape overall, and includes a circular recess 66 that opens upward in its central portion. In a bottom wall 68 of the circular recess 66, there is formed a lower communication hole 58 that opens onto the upper surface of the bottom wall 68 facing the movable plate 54 and penetrates the bottom wall 68 in the vertical direction. In the present practical embodiment, a plurality of lower communication holes 58 are provided. In the present practical embodiment, the plurality of lower communication holes 58 are arranged at predetermined intervals in the diametrical direction and in the circumferential direction. However, the number and arrangement of the lower communication holes are not limited in any way. In addition, in each of the lower communication holes 58, the radially inner surface of the upper side part, which is the opening side to the circular recess 66, comprises a tapered sloping surface 70 whose diameter dimension gradually increases upward.

Figure 6:
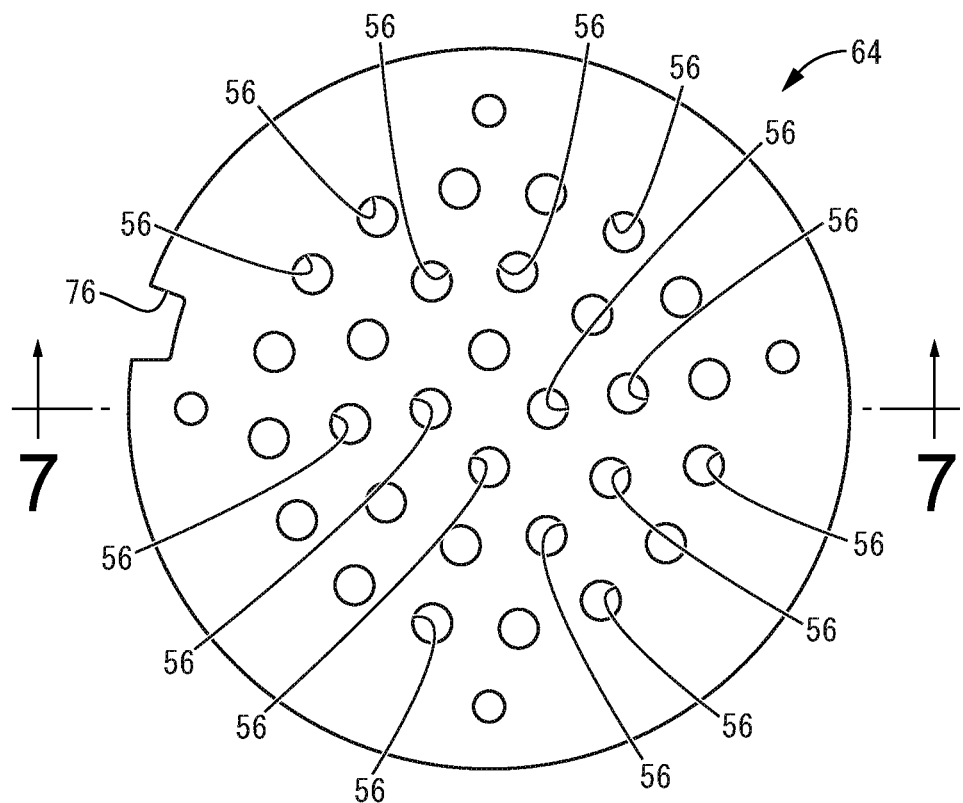
FIG. 6 is a top plan view showing a lid member that constitutes the partition shown in FIG. 2.
Figure 7:
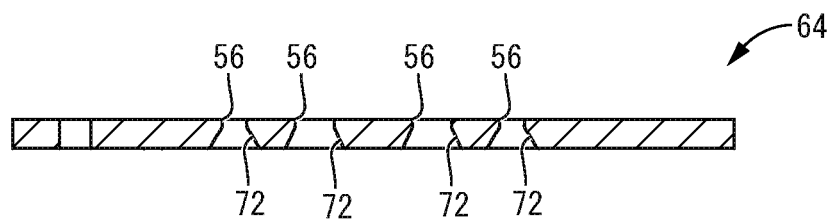
FIG. 7 is a cross-sectional view taken along line 7-7 of FIG. 6.
Figure 8:
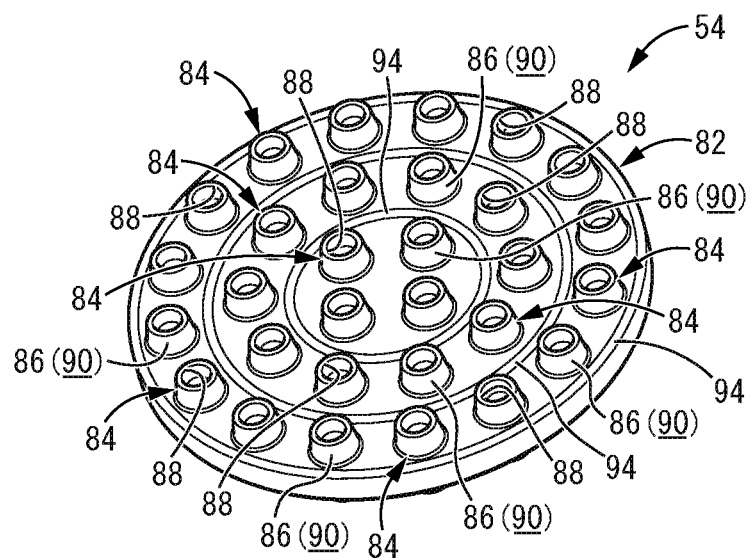
FIG. 8 is a perspective view showing the movable plate that constitutes the fluid-filled vibration damping device shown in FIG. 1.
Figure 9:
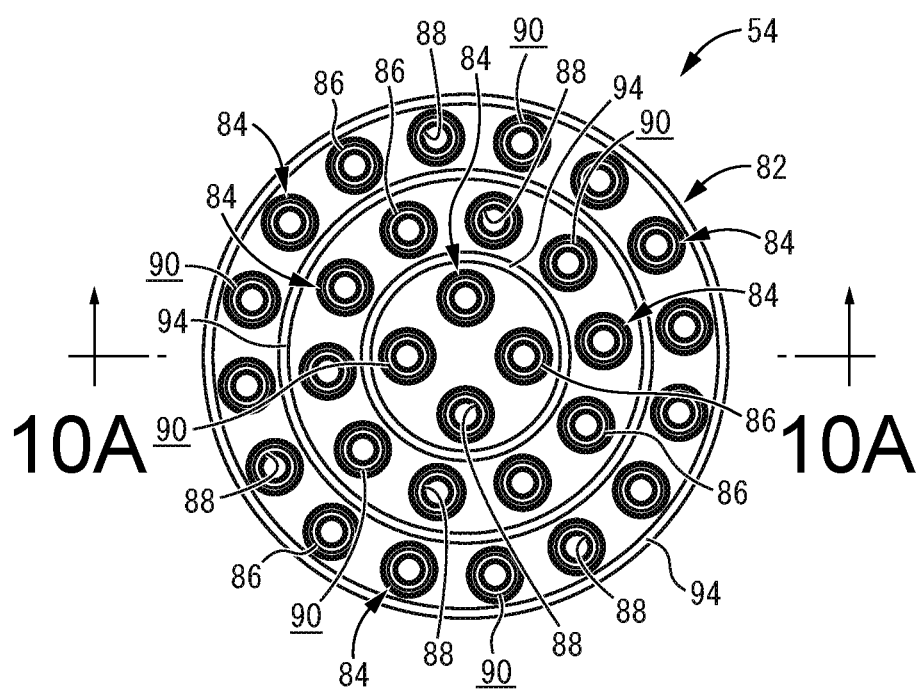
FIG. 9 is a top plan view of the movable plate shown in FIG. 8.
Figures 10A, 10B, 10C:
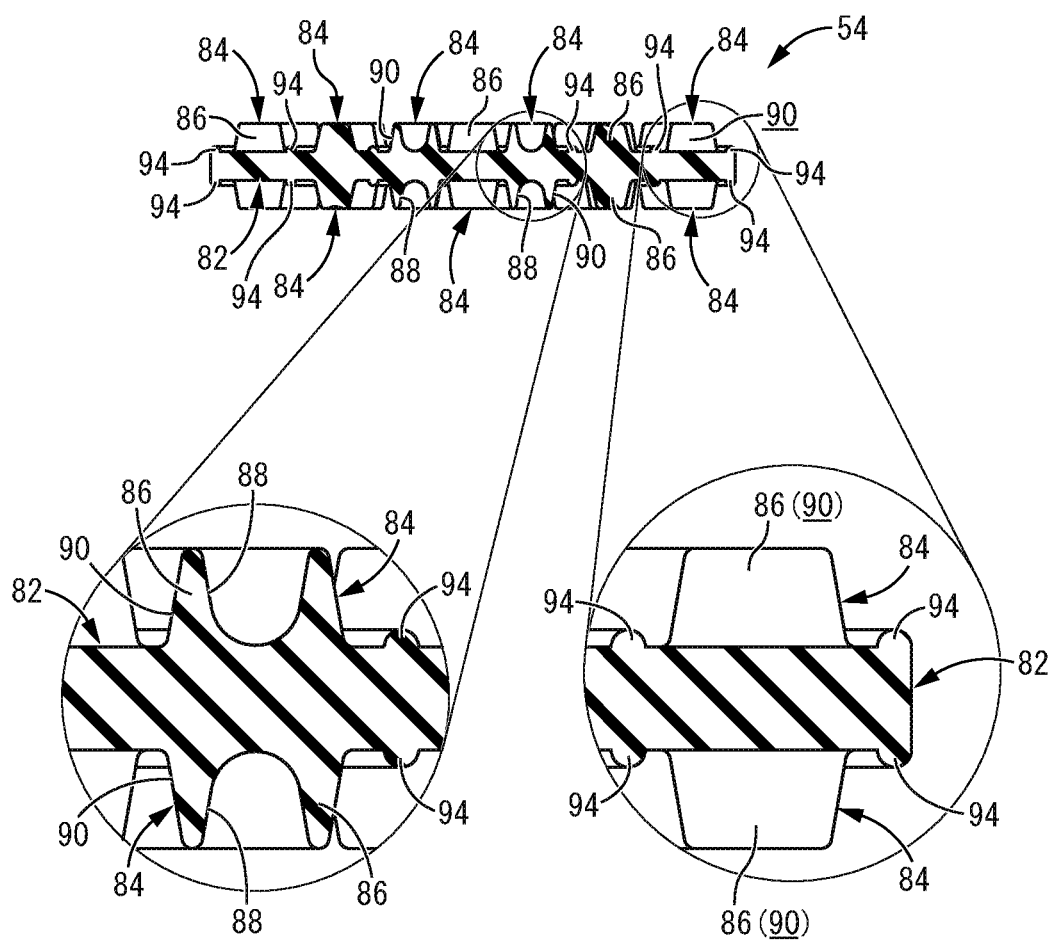
FIG. 10A is a cross-sectional view taken along line 10A-10A of FIG. 9, and FIGS. 10B and 10C are fragmentary enlarged views each showing a principal part of FIG. 10A.

Furthermore, as shown in FIGS. 6 and 7, the lid member 64 has a generally circular disk shape with a thickness smaller than that of the partition main body 62. The lid member 64 includes an upper communication hole 56 that opens onto the lower surface of the lid member 64 facing the movable plate 54 and penetrates the lid member 64 in the vertical direction. In the present practical embodiment, a plurality of upper communication holes 56 are provided, and they are set at positions vertically opposed to the lower communication holes 58 of the partition main body 62. Further, in the present practical embodiment, in the upper communication hole 56, the radially inner surface of the lower side part, which is the opening side to the partition main body 62, comprises a tapered sloping surface 72 whose diameter dimension gradually increases downward.

The partition 38 is constituted by the partition main body 62 and the lid member 64 as described above being overlapped and fixed with each other by a plurality of bolts 73. By the upper opening of the circular recess 66 in the partition main body 62 being covered with the lid member 64 in this way, the aforementioned housing area 52 for housing the movable plate 54 is formed inside the partition 38. The housing area 52 has a roughly flat circular shape that extends in the axis-perpendicular direction.

On the outer peripheral edge of the partition main body 62, a circumferential groove 74 opens onto its outer peripheral surface and continuously extends in the circumferential direction with a length approximately just short of its circumference. The circumferential groove 74 is covered with the lid member 64, and further the outer circumference of the circumferential groove 74 is covered with the second mounting member 14, so as to form the aforementioned orifice passage 50. One lengthwise end of the orifice passage 50 communicates with the primary liquid chamber 44 via an upper through hole 76 provided in the lid member 64, while the other lengthwise end of the orifice passage 50 communicates with the auxiliary liquid chamber 46 via a lower through hole 78 provided in the partition main body 62.

On the other hand, as shown in FIG. 8 through FIG. 10C, the movable plate 54 has a generally circular disk shape overall, and in the present practical embodiment, the movable plate 54 is an integrally molded component made of an elastic material such as rubber or elastomer. The movable plate 54 includes a disc part 82 that extends in the axis-perpendicular direction, and the outside diameter dimension of the disc part 82 is smaller than the inside diameter dimension of the housing area 52 (circular recess 66).

Besides, elastic protrusions 84 projecting upward and downward are formed on the respective upper and lower surfaces of the disc part 82. In the present practical embodiment, a plurality of elastic protrusions 84 are provided at positions corresponding to the lower communication holes 58 of the partition main body 62 and the upper communication holes 56 of the lid member 64. With this arrangement, the upper and lower elastic protrusions 84 project respectively toward the upper communication holes 56 and the lower communication holes 58. Of course, the upper communication hole and the lower communication hole may be provided at positions different from each other, and correspondingly, the formation positions of the upper and lower elastic protrusions may be different from each other.

In the present practical embodiment, the elastic protrusion 84 has a roughly cylindrical hollow structure and rises perpendicularly from the disc part 82. The elastic protrusion 84 includes an annular peripheral wall 86 serving as the peripheral wall that is continuous about the entire circumference in the circumferential direction. That is, a concavity 88 that opens upward or downward is formed on the radially inner side of the annular peripheral wall 86 of the elastic protrusion 84. In the present practical embodiment, the axial end face of the annular peripheral wall 86 and the bottom face of the concavity 88 are constituted by curved surfaces. Accordingly, when viewed in vertical cross section shown in FIGS. 10A-10C, the radially outer surface and the radially inner surface of the elastic protrusion 84 are smoothly continuous with each other without any break points in the circumferential direction and in the height direction.

Also, in the present practical embodiment, the outside diameter dimension of the elastic protrusion 84 is gradually reduced toward the projecting distal end, and the radially outer surface of the elastic protrusion 84 (annular peripheral wall 86) comprises a tapered sloping surface 90. In particular, in the present practical embodiment, the outside diameter dimension at the projecting distal end of the elastic protrusion 84 (annular peripheral wall 86) is made roughly equal to or slightly larger than the minimum inside diameter dimension of the sloping surfaces 72, 70 in the respective upper communication hole 56 and the lower communication hole 58, as well as made smaller than the maximum inside diameter dimension of the sloping surfaces 72, 70 in the respective the upper communication hole 56 and the lower communication hole 58.

Here, the projecting dimension of the elastic protrusion 84 is larger than the distance between the opposed faces of the disc part 82 and the partition 38. With this configuration, even when the disc part 82 is positioned at the moving end of one of the upper and lower sides in the housing area 52, the elastic protrusion 84 projecting to the other of the upper and lower sides is configured to be maintained in the inserted state in the upper or lower communication holes 56, 58.

Additionally, with respect to the elastic protrusions 84 inserted into the upper and lower communication holes 56, 58, the distal end portions thereof are axially opposed to the respective sloping surfaces 72, 70 of the upper communication hole 56 and the lower communication hole 58. In the present practical embodiment, as shown in the enlarged view of FIG. 3, there is formed a gap 92 between the elastic protrusion 84 and the radially inner surfaces of the upper communication hole 56 and the lower communication hole 58. That is, the distal end portion of the elastic protrusion 84 and the sloping surfaces 72, 70 on the radially inner surfaces of the upper communication hole 56 and the lower communication hole 58 are opposed to each other with a predetermined remote distance in the vertical direction (axial direction) and in the axis-perpendicular direction.

On the other hand, the inside diameter dimension of the elastic protrusion 84 (annular peripheral wall 86) is roughly constant in the direction of protrusion or gradually increases toward the projecting distal end. By so doing, the annular peripheral wall 86 has a shape in which the thickness dimension gradually decreases from the projecting proximal end portion toward the projecting distal end portion.

Moreover, in the present practical embodiment, the disc part 82 includes a cushion projection 94 that projects toward the partition 38 at a position away from the elastic protrusion 84. The cushion projection 94 has a projecting dimension smaller than that of the elastic protrusion 84. In particular, in the present practical embodiment, a plurality of annular cushion projections 94 having different diameter dimensions are provided in a concentric manner on both upper and lower surfaces of the disc part 82.

The projecting dimension of the cushion projection 94 is configured such that, in the state where the disc part 82 is positioned in the middle of the vertical moving stroke in the housing area 52, the disc part 82 does not reach the inner surface of the housing area 52 where the disc part 82 faces. With this configuration, as shown in FIG. 3, in the disc part 82 located at the center in the vertical direction in the housing area 52, the axial distance a between the distal end portion of the elastic protrusion 84 and the radially inner surfaces (sloping surfaces 72, 70) of the upper and lower communication holes 56, 58 in the partition 38 is smaller than the axial distance b between the distal end of the cushion projection 94 and the upper and lower inner surfaces of the housing area 52 of the partition 38 (a<b). As a result, when the movable plate 54 moves upward or downward in the plate thickness direction, in comparison with the amount a of the movement of the movable plate 54 until the elastic protrusion 84 comes into contact with the partition 38 and is elastically deformed, the amount b of the movement of the movable plate 54 until the cushion projection 94 comes into contact with the partition 38 and is elastically deformed is greater.

Here, when the movable plate 54 is moved in the plate thickness direction from the state shown in FIG. 3 based on the pressure fluctuations exerted on the upper and lower surfaces due to vibration input, the distal end portion of the elastic protrusion 84 (annular peripheral wall) of the movable plate 54 and the sloping surface 90 thereof, which is the radially outer surface, come into contact with the wall portion of the upper communication hole 56 or the lower communication hole 58. In the present practical embodiment, the radially inner surfaces of the wall portions of the upper communication hole 56 and the lower communication hole 58 also comprise sloping surfaces 72, 70. Thus, the contact reaction force in the elastic protrusion 84 is exerted with a component force corresponding to the inclination angle of the sloping surfaces 90, 72, 70. Therefore, due to the movement of the movable plate 54 in the plate thickness direction, the elastic protrusion 84 is pressed not only in the compression direction, which is roughly the axial direction, but also in the shear direction, which is roughly the axis-perpendicular direction. Thus, the distal end portion of the elastic protrusion 84 (annular peripheral wall 86) is configured to be elastically deformed to the radially inner side of the upper communication hole 56 and the lower communication hole 58 as well.

As a result, in comparison with the case where the annular peripheral wall 86 simply undergoes compressive deformation, the striking noise when the elastic protrusion 84 (annular peripheral wall 86) comes into contact with the sloping surfaces 72, 70 of the upper communication hole 56 and the lower communication hole 58 can be effectively reduced.

In particular, in the present practical embodiment, since the annular peripheral wall 86 has a shape that becomes thinner toward the projecting distal end, elastic deformation at the distal end portion of the annular peripheral wall 86 will be more easily induced. By so doing, the effect of suppressing noise as described above can be more stably exhibited.

Moreover, in the present practical embodiment, the upper and lower communication holes 56, 58 and the elastic protrusions 84 are provided in plurality. Thus, in comparison with the case where a single large upper communication hole, a single large lower communication hole, and a single elastic protrusion are provided, the effects of improving the cushioning action and improving the stability of the movable plate due to the dispersion of the contact force can be exhibited. Furthermore, the elastic protrusions 84 provided on the upper surface of the movable plate 54 and the elastic protrusions 84 provided on the lower surface of the movable plate 54 are provided at vertically corresponding positions. With this configuration, for example, when the elastic protrusions 84 on one side come into contact with the partition 38, the elastic protrusions 84 on the opposite side act as a mass member, thereby reducing strain generated in the movable plate 54.

Additionally, in the present practical embodiment, when a large vibration is input, in addition to the elastic protrusion 84, the cushion projection 94 also comes into contact with the partition 38. This makes it possible to more reliably regulate the amount of movement of the movable plate 54 by the cushion projection 94 after the cushioning action is exhibited by the elastic protrusion 84 that comes into contact first.

When a low-frequency, large-amplitude vibration such as engine shake is input to the engine mount 10, vibration damping effect due to the fluid flow through the orifice passage 50 is exhibited. In such a case, the upper communication hole 56 or the lower communication hole 58 of the partition 38 is narrowed (closed in the present practical embodiment) by the elastic protrusion 84 of the movable plate 54. Thus, the fluid flow through the orifice passage 50 will be efficiently induced, thereby stably attaining the vibration damping effect due to such fluid flow.

At that time, the projecting distal end portion of the annular peripheral wall 86 of the elastic protrusion 84 enters the upper communication hole 56 or the lower communication hole 58 and is elastically deformed so as to further decrease in diameter. Thus, the spring rigidity in the projecting distal end portion of the elastic protrusion 84 increases, making it possible to stabilize the shape of the movable plate 54, to improve the effect of regulating the amount of movement of the movable plate 54, and the like.

When a high-frequency, small-amplitude vibration such as idling vibration or driving rumble is input to the engine mount 10, the movable plate 54 is allowed to move without the upper and lower elastic protrusions 84 being in contact with the partition 38, or the movable plate 54 is allowed to move due to the upper and lower elastic protrusions 84 coming into contact with the partition 38 and being elastically deformed. In association with such movement of the movable plate 54, the liquid pressure absorber 60 that reduces the pressure fluctuations in the primary liquid chamber 44 functions, thereby exhibiting low dynamic spring effect.

Figure 11:
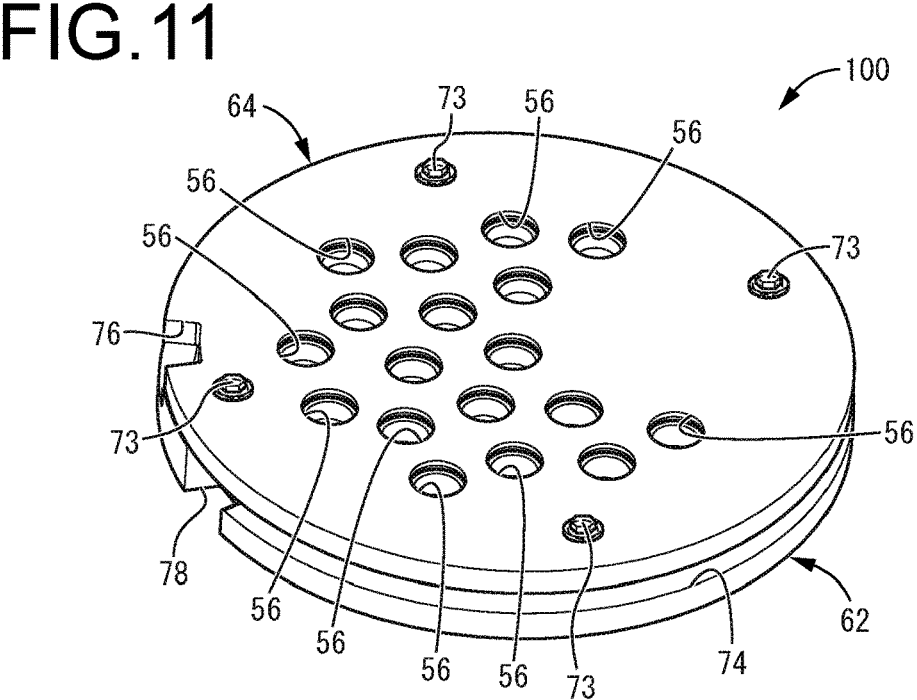
FIG. 11 is a perspective view showing a partition that constitutes a fluid-filled vibration damping device according to a second practical embodiment of the present invention, in a state where a movable plate is supported.
Figure 12:
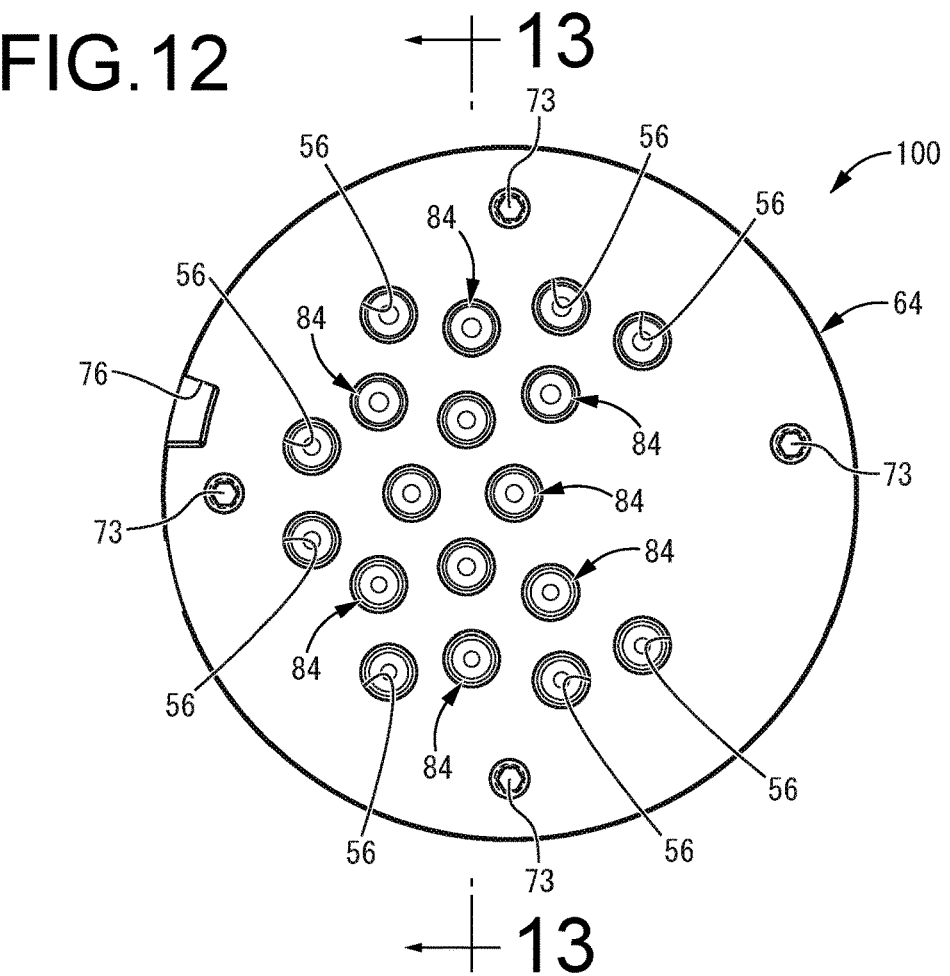
FIG. 12 is a top plan view of the partition shown in FIG. 11.
Figure 13:
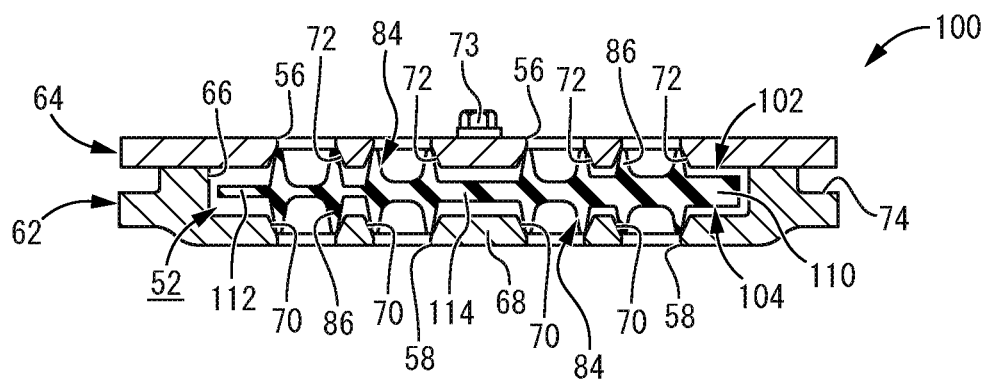
FIG. 13 is a cross-sectional view taken along line 13-13 of FIG. 12.
Figure 14:
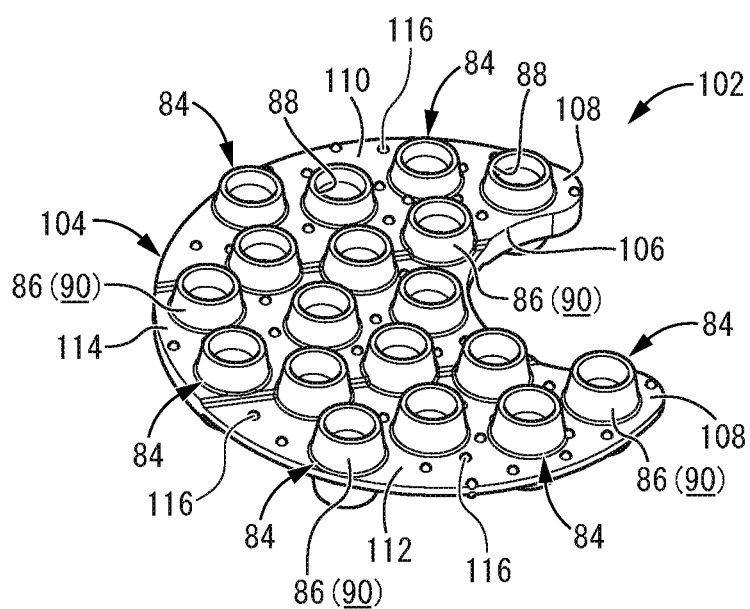
FIG. 14 is a perspective view showing a movable plate supported by the partition shown in FIG. 11.

Next, FIGS. 11 to 13 show a partition 100 employed in a fluid-filled vibration damping device according to a second practical embodiment of the present invention, and FIG. 14 shows a movable plate 102 supported by the partition 100. In the fluid-filled vibration damping device of the present practical embodiment, since the structure other than the partition 100 may be the same as that of the preceding practical embodiment, detailed description thereof will be omitted. Besides, the basic structure of the partition 100 of the present practical embodiment is the same as that of the first practical embodiment, but there are some differences such as the positions of the upper and lower communication holes 56, 58 being different from those of the first practical embodiment according to the positions of the elastic protrusions 84 provided on the movable plate 102. In the following description, elements like those in the preceding practical embodiment shall be designated by like reference numerals and will not be discussed in detail.

Described in detail, the movable plate 102 of the present practical embodiment is an integrally molded component made of an elastic material as in the preceding practical embodiment. In the preceding practical embodiment, the movable plate 54 includes the disc part 82 that extends in the axis-perpendicular direction. However, in the present practical embodiment, the movable plate 102 includes a base portion 104 that extends in the axis-perpendicular direction and has a planar shape of non-circular plate.

In particular, in the present practical embodiment, the base portion 104 having an irregular outer peripheral configuration in plan view is adopted. Specifically, a part of the outer peripheral portion of circular disk shape (right side in FIG. 14) is cut out by an arcuate concave part 106, so as to have an outer peripheral configuration of roughly crescent shape overall. The base portion 104 includes a pair of projecting parts 108, 108 that projects from a wide central portion thereof and gradually becomes narrower toward two circumferential ends of the crescent.

Further, in the present practical embodiment, the thickness dimension of the base portion 104 is varied in the left-right direction of FIG. 13 (roughly vertical direction of FIG. 14, which is the diametrical direction orthogonal to the axis of symmetry of the crescent). That is, in the base portion 104, the portion on the right side in FIG. 13 (upper side in FIG. 14) comprises a thick-walled part 110, while the portion on the left side in FIG. 13 (lower side in FIG. 14) comprises a thin-walled part 112. Between the thick-walled part 110 and the thin-walled part 112, there is provided a middle part 114 having a middle thickness dimension between those of the thick-walled part 110 and the thin-walled part 112. In the present practical embodiment, the center of thickness is set on the same plane over the entire base portion 104.

In the base portion 104 of the present practical embodiment having such a structure, the second moment of area or the section modulus is reduced in the axial direction extending in a specific direction on the surface, whereby the deformation rigidity of the specific portion in the plate surface direction of the base portion 104 is reduced, so that curving deformation is easily induced. In particular, in the present practical embodiment, since the outer peripheral configuration in plan view is non-circular and the width dimension thereof is made narrow, the deformation rigidity becomes smaller toward the two distal ends of the pair of projecting parts 108, 108 than that of the central portion. Further, by the thickness dimension being partially reduced, the deformation rigidity of the thin-walled part 112 is smaller than those of the thick-walled part 110 and the middle part 114.

The base portion 104 having the above-described shape includes the elastic protrusion 84 having the same structure as that of the preceding practical embodiment. In the present practical embodiment, a plurality of elastic protrusions 84 are provided on both upper and lower surfaces of the base portion 104 at approximately equal intervals over roughly the entire base portion 104. The vertical positions of the projecting ends of the elastic protrusions 84 are roughly equal to each other. For example, the elastic protrusions 84 provided on the thin-walled part 112 have the projecting height dimension from the surface of the base portion 104 larger than that of the elastic protrusions 84 provided on the thick-walled part 110.

Additionally, in the base portion 104, a plurality of grain projections 116 serving as cushion projections and having a smaller height dimension than the elastic protrusions 84 are provided at positions away from the elastic protrusions 84. In FIG. 13, the illustration of the grain projections 116 is omitted. By providing the grain projections 116, the same effect as the cushion projection 94 of the preceding practical embodiment can be exhibited.

The movable plate 102 of the present practical embodiment is housed in the housing area 52 of the partition 100, as in the preceding practical embodiment. The positions of the lower communication holes 58 in the partition main body 62 and the positions of the upper communication holes 56 in the lid member 64 in the partition 100 are set according to the arrangement mode of the elastic protrusions 84 in the movable plate 102.

Since the movable plate 102 is positioned within the housing area 52 by the elastic protrusions 84 entering into the respective upper and lower communication holes 56, 58, the housing area 52 in the present practical embodiment may also have the same circular shape as the preceding practical embodiment regardless of the shape of the base portion 104. However, by forming the housing area 52 with an irregular inside configuration that is slightly larger than the configuration corresponding to the outer peripheral configuration of the base portion 104 of the movable plate 102, it is also possible to prevent an error in the attachment direction of the movable plate 102 during manufacture or the like.

In the fluid-filled vibration damping device employing the partition 100 as described above, based on the pressure fluctuations exerted on the upper and lower surfaces of the movable plate 102 at the time of vibration input, the movable plate 102 is moved accompanied by the elastic deformation of the base portion 104 in the plate thickness direction. In the present practical embodiment, the widthwise dimension and the thickness dimension of the base portion 104 are varied in the plate surface direction, so that the deformation rigidity in the bending direction is partially varied, and the base portion 104 is provided with a portion that is easy to elastically deform and a portion that is difficult to elastically deform. Therefore, when the elastic protrusions 84 come into contact with the sloping surfaces 72, 70 of the upper and lower communication holes 56, 58, the elastic protrusions 84 provided on the portion of the base portion 104 that is easy to elastically deform come into contact first, while the elastic protrusion 84 provided on the portion of the base portion 104 that is difficult to elastically deform come into contact later. Accordingly, the elastic protrusions 84 are prevented from coming into contact with the wall portions of the communication holes 56, 58 at the same time, thereby further reducing the striking noise or impact caused by the contact.

Figure 15:
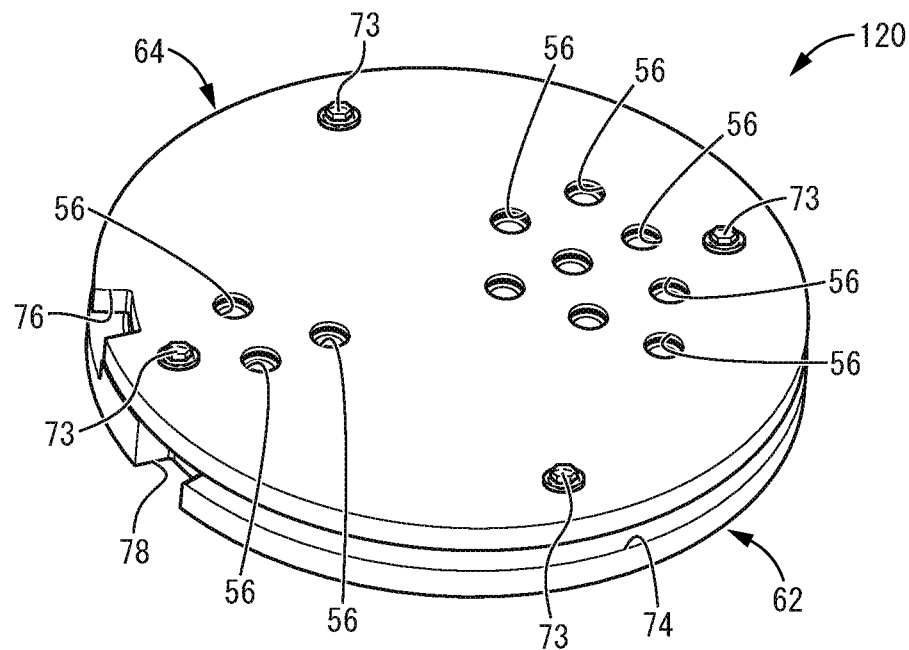
FIG. 15 is a perspective view showing a partition that constitutes a fluid-filled vibration damping device according to a third practical embodiment of the present invention, in a state where a movable plate is supported.
Figure 16:
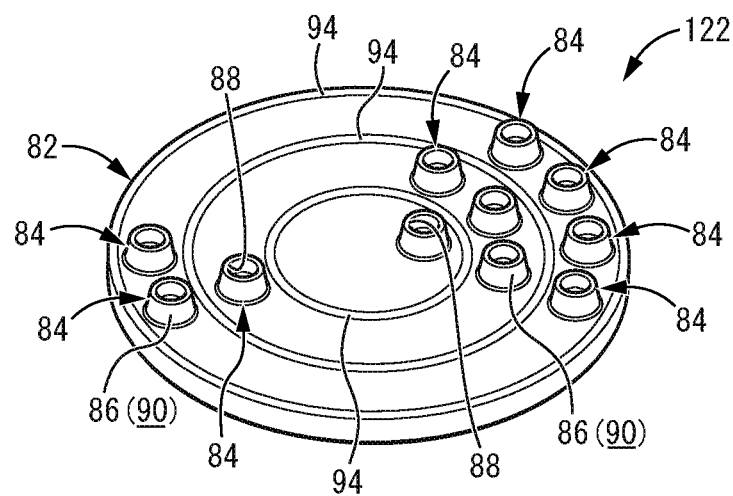
FIG. 16 is a perspective view showing a movable plate supported by the partition shown in FIG. 15.

Next, FIG. 15 shows a partition 120 employed in a fluid-filled vibration damping device according to a third practical embodiment of the present invention, and FIG. 16 shows a movable plate 122 supported by the partition 120. In the fluid-filled vibration damping device of the present practical embodiment as well, since the structure other than the partition 120 may be the same as that of the preceding practical embodiment, detailed description thereof will be omitted. Besides, the basic structure of the partition 120 of the present practical embodiment is also the same as that of the preceding practical embodiment, but there are some differences such as the positions of the upper and lower communication holes 56, 58 being different from those of the first practical embodiment according to the positions of the elastic protrusions 84 provided on the movable plate 102.

The movable plate 122 of the present practical embodiment includes a disc part 82 similar to that of the first practical embodiment, and a plurality of elastic protrusions 84 are provided on both upper and lower surfaces of the disc part 82. In the first practical embodiment, the elastic protrusions 84 are provided at roughly equal intervals over the entire movable plate 54. However, in the present practical embodiment, the elastic protrusions 84 are unevenly distributed in the plate surface direction of the movable plate 122.

Specifically, a plurality of elastic protrusions 84 are provided on each of the right side and the left side in FIG. 16, which are opposed to each other along an axis in the diametrical direction with the center of the movable plate 122 interposed therebetween. The number of elastic protrusions 84 provided in the right semicircular region located on the right side in FIG. 16 is greater than the number of elastic protrusions 84 provided in the left semicircular region located on the left side in FIG. 16.

Besides, corresponding to such an arrangement mode of the elastic protrusions 84, the upper and lower communication holes 56, 58 in the partition 120 are located unevenly in the plate surface direction of the movable plate 122. That is, a plurality of upper and lower communication holes 56, 58 are formed on each of the right side and the left side in FIG. 15. The number of the upper and lower communication holes 56, 58 provided on the right side in FIG. 15, which is one side on one diametrical direction line of the partition 120, is larger than the number of the upper and lower communication holes 56, 58 provided on the left side in FIG. 15, which is the other side.

In the fluid-filled vibration damping device including the partition 120 having the above-described structure, the fluid pressure exerted on the upper and lower surfaces of the movable plate 122 due to the vibration input is roughly equal per unit area through the upper and lower communication holes 56, 58. Thus, according to the uneven distribution of the upper and lower communication holes 56, 58, the fluid pressure exerted on the movable plate 122 is also unevenly distributed in the planar direction of the movable plate 122. Therefore, with respect to the circular partition 120, in comparison with the left side in FIGS. 15 and 16 where the existence density of the upper and lower communication holes 56, 58 is smaller, on the right side in FIGS. 15 and 16 where the existence density of the upper and lower communication holes 56, 58 is greater, a larger fluid pressure will be exerted on the same area. When vibration is input, the right side in FIG. 16 of the movable plate 122 greatly undergoes elastic deformation prior to the left side thereof, and the elastic protrusions 84 in the right region come into contact with the sloping surfaces 72, 70 of the upper and lower communication holes 56, 58. Then, the elastic protrusions 84 in the left region in FIG. 16 of the movable plate 122 come into contact with the sloping surfaces 72, 70 of the upper and lower communication holes 56, 58 with a delay. As a result, the moments of contact of individual elastic protrusions 84 with the wall portions of the communication holes 56, 58 are shifted in time, thereby further reducing the striking noise or the like.

Although the practical embodiments of the present invention have been described above, the present invention should not be limitedly interpreted by the specific description of the practical embodiments, but may be embodied with various changes, modifications, improvements, etc. which may occur to those skilled in the art.

Figure 17:
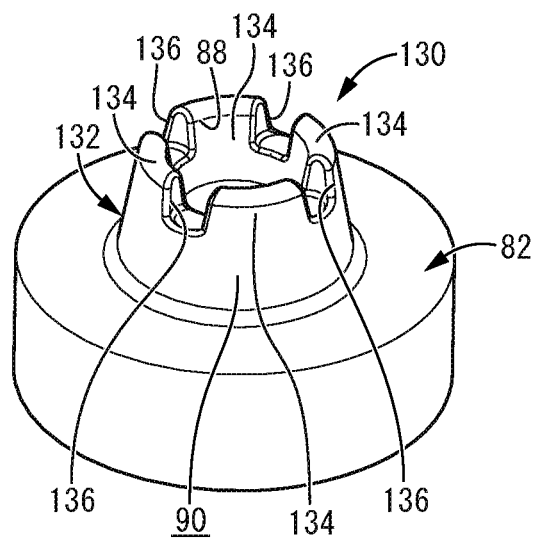
FIG. 17 is a perspective view showing another embodiment of the elastic protrusion according to the present invention.

For example, in the preceding practical embodiment, the elastic protrusion 84 includes the annular peripheral wall 86 that is continuous in a tubular shape about the entire circumference in the circumferential direction, but the peripheral wall of the elastic protrusion is not limited to an annular shape that is continuous about the entire circumference. More specifically, it would also be acceptable that, like an elastic protrusion 130 shown in FIG. 17, the projecting proximal end portion thereof comprises an annular peripheral wall 132 that extends about the entire circumference, while the projecting distal end portion thereof is divided in the circumferential direction so as to comprise a plurality of segmented peripheral walls 134 each projecting from the annular peripheral wall 132 toward the distal end. That is, the elastic protrusion 130 of the present practical embodiment includes a plurality of notch-shaped dividing parts 136 extending from the projecting distal end edge toward the proximal end side to the middle portion in the height direction, which are provided in plurality (four in FIG. 17) on the circumference. By the distal end portion of the tubular elastic protrusion 130 being divided by the dividing parts 136 in the circumferential direction, there are provided the plurality of (four in FIG. 17) segmented peripheral walls 134 that are elastically deformable substantially in an independent manner in the circumferential direction. In the elastic protrusion 130 provided with the plurality of segmented peripheral walls 134 at its distal end portion that comes into contact with the wall portion of the communication hole in this way, it is possible to set the spring characteristic of the elastic protrusion 130 in the shear direction to be softer. This makes it possible to improve a degree of freedom in tuning the cushioning action of the elastic protrusion 130, the movement characteristics of the movable plate in the plate thickness direction or the like when the movable plate comes into contact with the partition. Although a single elastic protrusion 130 is shown in FIG. 17, similarly to the elastic protrusion 84 of the practical embodiments shown in FIG. 1 and the like, a plurality of elastic protrusions 130 may be provided on at least one of the upper and lower surfaces of the movable plate.

Figure 18:
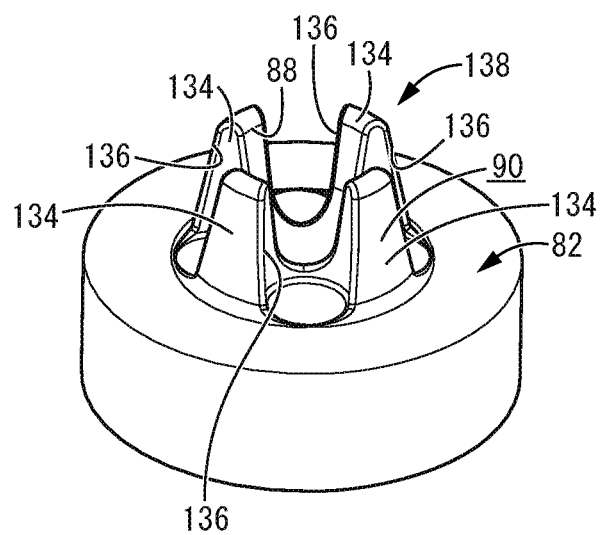
FIG. 18 is a perspective view showing yet another embodiment of the elastic protrusion according to the present invention.

In addition, as in the practical embodiment shown in FIG. 18, as the peripheral wall of an elastic protrusion 138, it would also be possible to adopt a plurality of segmented peripheral walls 134 which are divided in the circumferential direction without providing the annular peripheral wall that is continuous about the entire circumference. That is, in the present practical embodiment, the dividing part 136 that extends from the distal end as far as the proximal end of the elastic protrusion 138 is provided between the segmented peripheral walls 134, 134 that are circumferentially adjacent to each other. In FIGS. 17 and 18, components and parts having the same structures as those in the preceding practical embodiments have been assigned the same drawing symbols as those in the preceding practical embodiments.

Figure 19A:
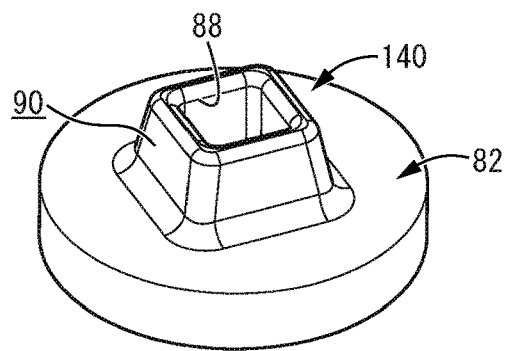
FIG. 19A is a perspective view showing still yet another embodiment of the elastic protrusion according to the present invention.
Figure 19B:
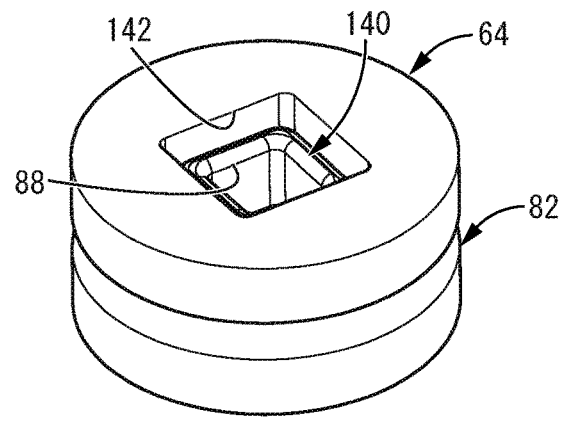
FIG. 19B is a perspective view showing a state where a movable plate provided with the elastic protrusion shown in FIG. 19A is mounted onto the partition.

Moreover, in the first practical embodiment, the elastic protrusion 84 (annular peripheral wall 86) has a shape of roughly circular annulus (roughly round tubular shape), however, for example, like an elastic protrusion 140 shown in FIGS. 19A and 19B, a shape of roughly rectangular annulus may be adopted. In this case, it is preferable that an upper communication hole 142 and the lower communication hole (58) have a roughly rectangular shape corresponding to the elastic protrusion 140, as shown in FIG. 19B. However, it may alternatively be acceptable to adopt a communication hole having a roughly circular shape as in the preceding practical embodiment without corresponding thereto. That is, the shapes of the elastic protrusions and the communication holes are not limited in any way, but may be set to appropriate shapes such as circles (including ovals, ellipses, and semicircles) and polygons, taking into consideration the required vibration damping characteristics, molding conditions, and the like. For example, in the elastic protrusion, it is also possible to form the peripheral wall by a plurality of rod-shaped projections or the like that are formed projecting upright from the movable plate and are spaced apart from each other in the circumferential direction.

Figure 20A:
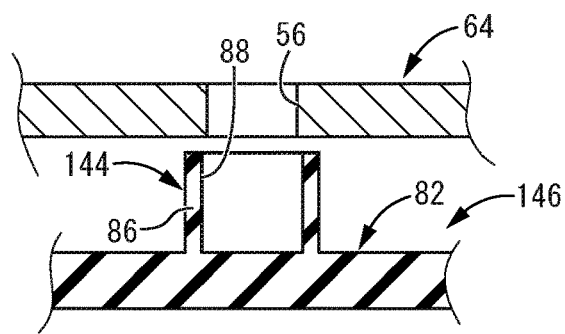
FIGS. 20A and 20B are vertical cross-sectional views showing a further embodiment of the elastic protrusion and the partition according to the present invention, where
Figure 20B:
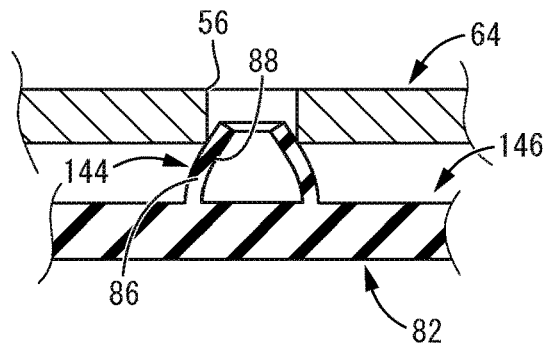

Furthermore, in the preceding practical embodiments, as shown in FIG. 8 through FIG. 10C and FIGS. 14 and 16, in the isolated state before being housed in the partitions 38, 100, 120, the elastic protrusion 84 (annular peripheral wall 86) of the movable plates 54, 102, 122, has a tapered shape whose outside diameter dimension decreases toward the projecting distal end. However, like an elastic protrusion 144 shown in FIG. 20A, the elastic protrusion may linearly project toward the partition 38 (lid member 64 or partition main body (62)). In such a case, as shown in FIG. 20B, it would also be possible that a movable plate 146 including the elastic protrusion 144 is housed within the partition 38, whereby the elastic protrusion 144 is elastically deformed to the radially inner side, so as to be inserted into the communication hole (upper communication hole 56 or lower communication hole (58)). With such a shape, when a vibration such as engine shake is input, the elastic protrusion 144 comes into contact with the opening peripheral edge of the upper communication hole 56 and is pressed in the compression direction and in the shear direction. By so doing, the elastic protrusion 144 is elastically deformed further to the radially inner side of the upper communication hole 56, thereby attaining the effect of suppressing noises similarly to the preceding practical embodiments.

Besides, whereas in the preceding practical embodiments, the movable plates 54, 102, 122 are integrally molded components made of an elastic material such as rubber or elastomer, the present invention is not limited to such an embodiment. For example, the disk part or the like of the movable plate may be, wholly or partially, formed of or reinforced by a rigid material such as metal or synthetic resin.

Additionally, in the preceding practical embodiments, the elastic protrusions 84 are provided on both the upper and lower surfaces of the movable plates 54, 102, 122. However, the elastic protrusions according to the present invention may be provided on only one surface of the movable plate. In that case, on the other surface of the movable plate, various cushion projections which are known in the art may be adopted as needed.

In the preceding practical embodiments, the plurality of elastic protrusions 84 are provided, but only a single elastic protrusion may be provided. When a plurality of elastic protrusions are provided, they do not need to have the identical shape with each other as in the preceding practical embodiment, but may alternatively adopt a plurality of types of elastic protrusions having different shapes or sizes. Also, it is possible to combine a plurality of types of elastic protrusions having different projecting dimensions and spring characteristics as shown in FIG. 17 and FIG. 18 and provide them to one movable plate. In addition, by the shapes (including the inclination angles) and sizes (circumferential dimension, height dimension, thickness dimension, etc.) being varied among the plurality of elastic protrusions, or by the shape and size of one elastic protrusion being varied along the circumference, it is possible to vary the timings at which the elastic protrusion and the partition strike, or the frequency of the striking noise. When the shapes and sizes of the plurality of elastic protrusions are varied, it is preferable that the shapes and sizes of the communication holes be varied corresponding thereto, but they are not limited to such an embodiment. Besides, by making the shapes and sizes of the elastic protrusions identical while making the shapes and sizes of the corresponding communication holes different, the timings of contact of the elastic protrusions with the wall portions can be varied or the like. By so doing, it is also possible to obtain substantially the same working effects as in the case where the shapes and sizes of the elastic protrusion are varied. Alternatively, by making the shapes and sizes of the elastic protrusions identical while varying the thickness dimension of the base portion as in the second practical embodiment, the vertical positions of the projecting distal end of the elastic protrusions can be varied. With this configuration, the timings of contact of the elastic protrusions with the wall portions can be varied.

Moreover, the orifice passage 50 described in the preceding practical embodiment is not essential. A mechanism such as an orifice passage can be adopted as necessary in consideration of the vibration damping characteristics or the like required of the vibration damping device.

Furthermore, the cushion projection 94 and the grain projection 116 described in the preceding practical embodiments are not essential, and it is also possible to provide cushion projections having a plurality of types of projecting height, elasticity, or the like.

In the preceding practical embodiment, the elastic protrusion 84 (annular peripheral wall 86) has a shape that becomes thinner toward the projecting distal end, but the present invention is not limited to such an embodiment. Even if the elastic protrusion 84 has the shape that becomes thinner, it is not necessary to become thinner at a roughly constant rate of change toward the projecting distal end as in the preceding practical embodiment. For example, by the inclination angles of the radially outer surface or the radially inner surface being made partially different or stepwise in the direction of protrusion of the elastic protrusion or the like, the projecting distal end of the elastic protrusion may be thinner than the proximal end thereof.

In the preceding practical embodiments, in the state where the movable plates 54, 102, 122 are positioned at roughly the center of the moving stroke, the movable plates 54, 102, 122 are spaced away by a prescribed distance from the partitions 38, 100, 120 located above and below the movable plates 54, 102, 122. However, for example, the elastic protrusions 84 may be in contact with no gap or pressed against the respective wall portions of the communication holes of the partitions 38, 100, 120 on the upper and lower surfaces of the movable plates 54, 102, 122.

In the first and third practical embodiments, the movable plates 54, 122 have a generally circular disk shape overall, but the present invention is not limited to such an embodiment. The shape in plan view of the movable plate may adopt various shapes such as a circle (including an oval, an ellipse, and a semicircle) and a polygon.

Additionally, for another purpose of reducing cavitation noise or the like due to bubbles generated in the primary liquid chamber 44 at the time of input of a large impact load, it would also be possible that the partitions 38, 100, 120 and/or the movable plates 54, 102, 122 include another mechanism such as a micro through hole that is always open. Besides, for the purpose of expanding or broadening the vibration frequency range where the vibration damping effect based on the resonance action of the fluid is exhibited, it would also be possible to form a plurality of orifice passages, or to arrange an independent movable plate or a movable film in parallel. For example, by forming the housing area 52 in the partition 100 of the second practical embodiment into a crescent shape corresponding to the movable plate 102, it is also possible to dispose a valve body (64) for preventing cavitation or the like as shown in U.S. Publication No. US 2019/154105, for example, in a portion away from the housing area 52 in the partition 100.

In the second practical embodiment, the structure in which the movable plate 102 (base portion 104) has an irregular shape by its widthwise dimension being varied so that the deformation rigidity is varied is adopted in conjunction with the structure in which the thickness of the movable plate 102 (base portion 104) is varied so that the deformation rigidity is varied. However, it would be acceptable that only one of the said structures is adopted.

Besides, it would also be possible to adopt the structure of the movable plate in the second practical embodiment in which the deformation rigidity is partially varied in combination with the structure in the third practical embodiment in which the communication holes are partially unevenly distributed. Note that, in the third practical embodiment, the communication hole that exerts the fluid pressure fluctuations on the movable plate 102 at the time of vibration input may include a communication hole provided at a position away from the elastic protrusion 84.

In addition, when partially varying the deformation rigidity of the movable plate 102, it can be realized by setting, for example, the second moment of area on a specific line in the planar direction to be varied. Thus, various shapes can be adopted without being limited to the crescent shape as shown by way of example herein. When partially adjusting the deformation rigidity of the movable plate, it would also be acceptable to provide a projection or a notch on the outer peripheral portion of a basic shape such as a circle to form a partially projecting portion, to provide a through hole, to form a reinforcing rib projecting and extending on the surface, to fix or embed a partial reinforcing member, or the like.

Further, the deformation rigidity of the movable plate 102 is grasped as a whole including not only the base portion 104 but also the elastic protrusions 84 and the like. Thus, for example, when the elastic protrusions 84 are unevenly distributed or the sizes of the elastic protrusions 84 are varied or the like, it is possible to adjust the deformation rigidity including the elastic protrusions 84. Moreover, when setting the deformation rigidity of the movable plate, for example, it is also possible to set various types of design conditions and use a finite element method or the like. By simulating in consideration of uneven distribution of the fluid pressure acting on the surface of the movable plate during vibration input concomitantly as well, it is possible to appropriately adjust the timings of contact of the plurality of elastic protrusions with the wall portions of the communication holes provided in the partition to be varied.

Furthermore, the movable plate according to the present invention is not limited to the one that the entirety thereof moves (undergoes vibration displacement) in the plate thickness direction due to the fluid pressure action as in the preceding practical embodiments. That is, even with the movable plate having a mode of being partially restrained or limited in movement, the movable portion thereof may be provided with the peripheral wall that is pressed in the compression direction as well as in the shear direction and is elastically deformed by the contact with the wall portion of the communication hole of the partition, whereby the present invention can be implemented. Incidentally, as a movable plate having a mode of being partially restrained or limited in movement, exemplified is a structure in which, as disclosed in U.S. Pat. No. 4,781,362 or U.S. Publication No. US 2009/140476, for example, at least one of the center and the outer peripheral edge of the movable plate is supported in a restrained state and is elastically deformable and displaceable.

In addition, the fluid-filled vibration damping device according to the present invention is not limited to the automotive engine mount as in the first practical embodiment, but the present invention may be implemented in vibration damping devices such as automotive strut mounts, member mounts, body mounts, and the like, or may be implemented in non-automotive vibration damping devices. In that case, depending on the requirements of the vibration damping device to which the present invention is applied, for example, it would be possible that the first and second mounting members are not bonded to the main rubber elastic body, or that the main rubber elastic body is attached to the connection target without providing the first and second mounting members. Further, it is acceptable as long as the primary liquid chamber and the auxiliary liquid chamber give rise to relative pressure fluctuations during vibration input. That is, the primary liquid chamber and the auxiliary liquid chamber may comprise a pressure-receiving chamber to which vibration is input and an equilibrium chamber that permits changes in volume as in the practical embodiment, or may alternatively comprise first and second pressure-receiving chambers in which roughly opposite positive and negative pressure fluctuations to each other arise. Moreover, the present invention is also applicable to a conventionally known tubular fluid-filled vibration damping device in which a fluid chamber is formed between an inner shaft member and an outer tube member that are connected by a main rubber elastic body. That is, no limitation is imposed as to the basic structure of the fluid-filled vibration damping device to which the present invention is applied.

What is claimed is:

1. A fluid-filled vibration damping device comprising:
a primary liquid chamber;
an auxiliary liquid chamber;
a partition provided between the primary liquid chamber and the auxiliary liquid chamber; and
a movable plate supported movably in a plate thickness direction thereof by the partition, the movable plate receiving on one face thereof liquid pressure of the primary liquid chamber and on another face thereof liquid pressure of the auxiliary liquid chamber so as to constitute a liquid pressure absorber, wherein
at least one communication hole opens onto a surface of the partition, the surface facing the movable plate,
at least one elastic protrusion projects from the movable plate toward the communication hole,
the elastic protrusion includes a peripheral wall, the peripheral wall being configured to be pressed in a compression direction as well as in a shear direction and be elastically deformed to a radially inner side of the communication hole as well by means of the peripheral wall coming into contact with a wall portion of the communication hole due to movement of the movable plate in the plate thickness direction, and
the elastic protrusion of the movable plate includes a hollow annular peripheral wall serving as the peripheral wall.

2. The fluid-filled vibration damping device according to claim 1, wherein the movable plate includes a cushion projection projecting toward the partition, and
an amount of movement of the movable plate in the plate thickness direction until the cushion projection comes into contact with the partition is greater than an amount of movement of the movable plate in the plate thickness direction until the elastic protrusion comes into contact with the communication hole and is elastically deformed.

3. The fluid-filled vibration damping device according to claim 1, wherein the at least one communication hole of the partition comprises a plurality of communication holes while the at least one elastic protrusion of the movable plate comprises a plurality of elastic protrusions, and the communication holes and the elastic protrusions are provided at corresponding positions.

4. The fluid-filled vibration damping device according to claim 1, wherein the communication hole of the partition includes a radially inner surface with which the peripheral wall of the elastic protrusion is configured to come into contact, the peripheral wall of the elastic protrusion includes a radially outer surface configured to come into contact with the communication hole, and
at least one of the radially inner surface of the communication hole and the radially outer surface of the peripheral wall of the elastic protrusion comprises a tapered sloping surface.

5. The fluid-filled vibration damping device according to claim 1, wherein the peripheral wall has a shape in which a thickness dimension is smaller in a distal end portion thereof than in a proximal end portion thereof.

6. The fluid-filled vibration damping device according to claim 1, wherein the movable plate is elastically deformable by being formed of an elastic material, and deformation rigidity of the movable plate is varied in a plate surface direction.

7. The fluid-filled vibration damping device according to claim 6, wherein the deformation rigidity of the movable plate is varied in the plate surface direction by a planar shape of the movable plate being non-circular.

8. The fluid-filled vibration damping device according to claim 6, wherein the deformation rigidity of the movable plate is varied in the plate surface direction by a thickness dimension of the movable plate being varied in the plate surface direction.

9. The fluid-filled vibration damping device according to claim 1, wherein in the partition, the communication hole is located unevenly in a plate surface direction of the movable plate.

10. The fluid-filled vibration damping device according to claim 1, wherein a proximal end portion of the peripheral wall, in a direction of protrusion of the peripheral wall, has an annular shape that continues around an entire circumference in a circumferential direction, while a distal end portion of the peripheral wall is divided into a plurality of segments in the circumferential direction by slits extending in a height direction.

* * * * *